United States Patent [19]

Stone et al.

[11] Patent Number: 4,647,769
[45] Date of Patent: Mar. 3, 1987

[54] OPTICAL ENCODER HAVING CONTROLLABLE LEAD-LAG PHASE TRIM SENSITIVITY

[75] Inventors: Thomas R. Stone, Pleasanton; Randolph H. Graham, San Jose, both of Calif.

[73] Assignee: Quantum Corporation, Milpitas, Calif.

[21] Appl. No.: 609,224

[22] Filed: May 11, 1984

[51] Int. Cl.[4] ............................................. G01D 5/34
[52] U.S. Cl. ........................... 250/231 SE; 250/237 G
[58] Field of Search ........ 250/231 SE, 237 G, 211 K; 340/347 P; 356/395

[56] References Cited

U.S. PATENT DOCUMENTS

| | | | |
|---|---|---|---|
| 3,400,275 | 9/1968 | Trump | 250/231 SE |
| 3,597,750 | 8/1971 | Brunner | 340/174.1 C |
| 3,633,038 | 1/1972 | Falk | 250/231 R |
| 3,693,023 | 9/1972 | Wasserman | 250/231 SE |
| 3,693,024 | 9/1972 | Hulle et al. | 250/231 SE |
| 3,723,748 | 3/1973 | Coburn et al. | 250/233 |
| 3,894,232 | 7/1975 | Laspesa | 250/231 SE |
| 3,995,156 | 11/1976 | Angersbach et al. | 250/237 G |
| 4,037,161 | 7/1977 | Westell | 356/398 |
| 4,075,478 | 2/1978 | Walker | 250/231 SE |
| 4,117,320 | 9/1978 | Tomlinson et al. | 250/237 G |
| 4,135,217 | 1/1979 | Jacques | 360/77 |
| 4,152,589 | 5/1979 | Mitchell | 250/231 SE |
| 4,184,071 | 1/1980 | Fryer et al. | 250/231 SE |
| 4,224,514 | 9/1980 | Weber | 250/231 SE |
| 4,266,125 | 5/1981 | Epstein et al. | 250/231 SE |
| 4,396,959 | 8/1983 | Harrison et al. | 360/77 |

Primary Examiner—Edward P. Westin
Assistant Examiner—William L. Oen
Attorney, Agent, or Firm—David B. Harrison

[57] ABSTRACT

An optical encoder having controllable lead lag phase trim sensitivity includes a light source, and a pair of coplanar photodetectors adjacent each another for generating phased electrical signals in response to light energy generated by the light source. A scale between the light source and photodetectors has alternating opaque and translucent regions extending substantially perpendicular to a locus of relative movement. A reticle has alternating opaque and translucent regions parallel to the regions of the scale so that relative movement of the scale and reticle alternately blocks and transmits light to the pair of photodetectors which put out phased electrical signals indicative of relative position and direction of movement of the scale and reticle. A substantially lineal light blocking zone formed on the reticle is arranged at a predetermined acute rotational angle relative to the locus of relative movement between the scale and reticle. A mechanism is provided for relatively rotating the scale and reticle about the centroid of said light blocking zone in order to adjust lead and lag trim of the phased electrical signals relative to a nominal phase difference, such as quadrature. The sensitivity of lead and lag trim is controlled by the particular acute rotational angle selected for the light blocking zone.

6 Claims, 6 Drawing Figures

FIG. I

OPTICAL ENCODER 100

1

OPTICAL ENCODER HAVING CONTROLLABLE LEAD-LAG PHASE TRIM SENSITIVITY

BACKGROUND OF THE INVENTION

This invention relates generally to optical encoders using a movable scale with optical slits to interrupt light shining on a photodetector. The electrical signals generated by the photodetector indicate velocity, direction of movement and position of the scale. More particularly, this invention relates to improvements which provide a simple and positive adjustment of the phase angle between the electrical signals generated by the optical encoder.

Optical encoders producing electrical signals corresponding to rotary or axial movement of mechanical parts are known in the art. These devices have been used as tachometers and position sensors for servomechanisms.

Generally, optical encoders have consisted of a stationary housing having a light source in alignment with a phototransducer array. A code disk or scale containing alternating opaque and translucent regions was mounted on a rotating shaft or moving part in such a manner as to interrupt the light beam between the source and the array. Movement of the scale caused the alternating opaque and translucent regions on the disk or scale to block and pass light to the phototransducer array. The pulses of light caused the phototransducer array to produce generally triangular waveform electrical signals having a frequency related to the velocity of the scale. Scale position could be determined by electrically counting the number of cycles effectively yielding a distance of position indication.

To increase position measurement resolution, the alternating opaque and translucent regions had a thin rectangular shape and were positioned so that the shortest dimension of this shape was parallel to the locus of scale movement. In this manner, the maximum number of pulses per unit scale movement was obtained.

A relatively large translucent region was required to provide a usable electrical power output from the phototransducer array. However, increasing the area of the translucent region decreased position detection resolution. To provide sufficient power output and sufficient resolution, a mask containing a plurality of alternating opaque and translucent regions was placed over the phototransducer array. The dimensions of the opaque and translucent regions in the mask matched those of the scale. When adjacent translucent regions of the moving scale aligned with those on the fixed mask, light would shine through a plurality of concurrently aligned translucent regions on to the phototransducer array, thus providing nearly full electrical power output. As the scale moved so that its opaque regions coincided with the translucent regions of the mask, all light to the phototransducer array would be blocked. In this manner, the number of pulses per unit movement of scale, and thus overall resolution, was determined by the width of the opaque and translucent regions measured along the locus of scale movement. Consequently, fine divisions of position could be attained without reducing power output.

To determine direction of scale movement, two photodetectors were incorporated in the phototransducer array. A fixed mask containing two sets of alternating opaque and translucent regions was placed over the phototransducer array. The pitch or distance between corresponding points on successive opaque regions was identical for both mask sets and the scale. However, the mask sets were spaced so that alignment of the translucent regions of the scale with those of the one set was not coincident with alignment with the second set. Generally, the mask sets were offset a distance equal to one quarter of the pitch which made the pulses from one photodetector lag the pulses from the other by 90 electrical degrees or one quarter of a complete cycle. This 90 electrical degree relationship is commonly called quadrature. In this manner, movement of the scale caused phased signals from the photodetectors. By electrically determining which signal lagged the other, direction of the scale movement was identified.

A major drawback with the type of encoder described was the criticality of alignment between the alternating opaque and translucent regions of the scale and those on the mask. Alignment had to be maintained in three dimensions to provide proper operation including maximum power output, regularity of waveform and repeatability of phase relationship.

One possible source of error was lack of a parallel relationship between the face of the scale and the face of the mask. In one prior patent, U.S. Pat. No. 4,224,514 to Weber, et al. describing an optical shaft encoder, errors so produced were minimized by forming the scale of a thin flexible stainless steel disk which was seated in a special guide formed by a surrounding rim and two thin mylar sheets disposed on either side of the stainless steel disk. The guide maintained the scale parallel to the mask even in the event of a slight misalignment of the shaft to which the scale was attached.

Another possible source of error was lack of a parallel relationship between the alternating opaque and translucent regions on the scale and those on the mask. In rotary applications when the scale takes the form of a disk mounted to a rotating shaft, this misalignment is an eccentricity error.

The Weber, et al, encoder attempted to minimize eccentricity error by using four photodetectors arranged in a rectangular pattern behind the mask. The electrical signals from the two photodetectors at diagonally opposite corners of the rectangle were differentially combined to produce one phase signal. The electrical signals from the remaining two photodetectors were similarly combined to produce the second phase signal. The differential combination scheme was said to nullify eccentricity errors. The Weber, et al. encoder had the disadvantage of requiring a relatively complex electro-mechanical system to overcome possible signal phase errors.

In U.S. Pat. No. 4,266,125 to Epstein, et al., an optical encoder was disclosed which attempted to nullify eccentricity errors by using three separate light beams. Three light sources and collimating lenses were used to direct the beams through the scale and the mask. A detector assembly having siamesed and truncated lenses was used to focus the beams on the photodetectors. The Epstein encoder had the disadvantage of requiring a complex light source arrangement and special lenses to overcome eccentricity errors.

Neither of these systems provided a simple adjustment of the encoder to eliminate alignment errors or adjust phase angle. Without such adjustment, error introduced by manufacturing tolerances could not be eliminated. Decreasing the dimensions of the opaque and translucent regions on the scale and mask to obtain higher resolution had a practical limit which was reached when tolerances affecting relative position of the scale and mask exceeded the dimensions of the translucent regions.

In the common assignee's co-pending application Ser. No. 555,591 now U.S. Pat. No. Optical Encoder Apparatus And Methods, an optical encoder was disclosed which provided a simple alignment adjustment. In that device, a housing held on a single axis a light source, a collimating lens, a mask and a phototransducer array. The housing contained a horizontal U-shaped notch through which the edge of the scale passed such that the alternating opaque and translucent regions of the scale interrupted the light beam. The housing also contained a cylindrical bore for rotatably mounting the encoder on a mounting post perpendicular to scale movement. On the mask were two sets of microlines which formed alternating opaque and translucent regions matching those on the scale. These sets were positioned side by side on the mask with the microlines of each perpendicular to the locus of scale movement. The width of the opaque region separating the two sets determined offset and therefore phase angle. The mask was positioned on the housing so that the center of this separating opaque region coincided with the center of housing rotation. Alignment was adjusted by rotating the housing on the mounting post until the rectangular shaped alternating opaque and translucent regions on the mask were parallel to those on the scale. After adjustment, the housing was securely clamped to the mounting post.

This encoder provided a simple method of eliminating alignment or eccentricity errors. By maximizing the instantaneous light transmission area when translucent regions are aligned, maximum power output was attained. The adjustment also had secondary effects on electrical waveform shape and phase angle. However, rotation of the housing in either direction provided unilateral adjustment which could only decrease phase angle. Thus, none of the encoders described above had a positive and simple adjustment for phase angle.

Phase angle adjustment was addressed in U.S. Pat. No. 3,460,275 to D. H. Trump. In that device a parabolic reflector behind a single light source was used to shine two separate light beams on two photodetectors. Axial movement of the reflector relative the light source changed the parallel, convergent or divergent relationship between the beams. This adjustment changed the effective distance between the mask sets and therefore phase angle. The device had the disadvantage of requiring a special and expensive parabolic reflector which was mounted inside the optical encoder housing. Adjustment required disassembly of the encoder. Also, a friction fit of the reflector within a housing bore was relied upon to maintain the adjustment.

A hitherto unsolved need in prior devices was for a simple and sure adjustment which maintained a repeatable and reliable phase angle setting and provided quick and accurate calibration during final assembly of the host equipment using the encoder.

SUMMARY OF THE INVENTION WITH OBJECTS

One general object of the present invention is to provide an improved optical encoder apparatus having easily adjustable phase angle.

Another object of the present invention is to provide an improved optical encoder which facilitates initial calibration during factory assembly thereby reducing assembly time.

One more object of the present invention is to provide an improved optical encoder which facilitates field calibration of the encoder thereby reducing down time for maintenance and service.

A further object of the present invention is to provide an improved optical encoder with a single bilateral adjustment to increase or decrease phase angle.

Another object of the present invention is to provide an improved optical encoder having a phase angle adjustment with limited sensitivity to enable manual calibration by technicians having minimum skill and training.

Yet another object of the present invention is to provide a positive means of adjusting phase angle so that errors produced incident to manufacturing tolerances can be eliminated.

These objects are achieved in an improved optical encoder of the type using a movable scale containing alternating opaque and translucent regions to interrupt a light beam shining on a phototransducer array. The phototransducer array comprises two or more individual photodetectors which are covered by a mask containing separate sets of alternating opaque and translucent regions. Each set overlies one photodetector. The improvement comprises a unique geometric layout of the alternating opaque and translucent region sets on the mask and a method for rotating the mask about its center. The mask layout positions the centroids of the sets on opposite ends of an imaginary line running through the center of mask rotation. The line forms an acute angle with the locus of scale movement. Rotation of the mask effectively changes the distance between sets as measured along the locus of scale movement. Rotation in one direction increases the distance between sets thus increasing phase angle between the electrical pulse trains generated by the photodetectors. Rotation in the other direction decreases the distance between sets and produces the opposite effect. The sensitivity of phase adjustment is controlled by selection of the acute angle of the line.

These and other objects, advantages and features of the present invention will be further understood and appreciated from a consideration of the following detailed description of a preferred embodiment presented with the accompanying drawings.

DETAILED DESCRIPTION OF A PREFERRED EMBODIMENT

Figure 1:
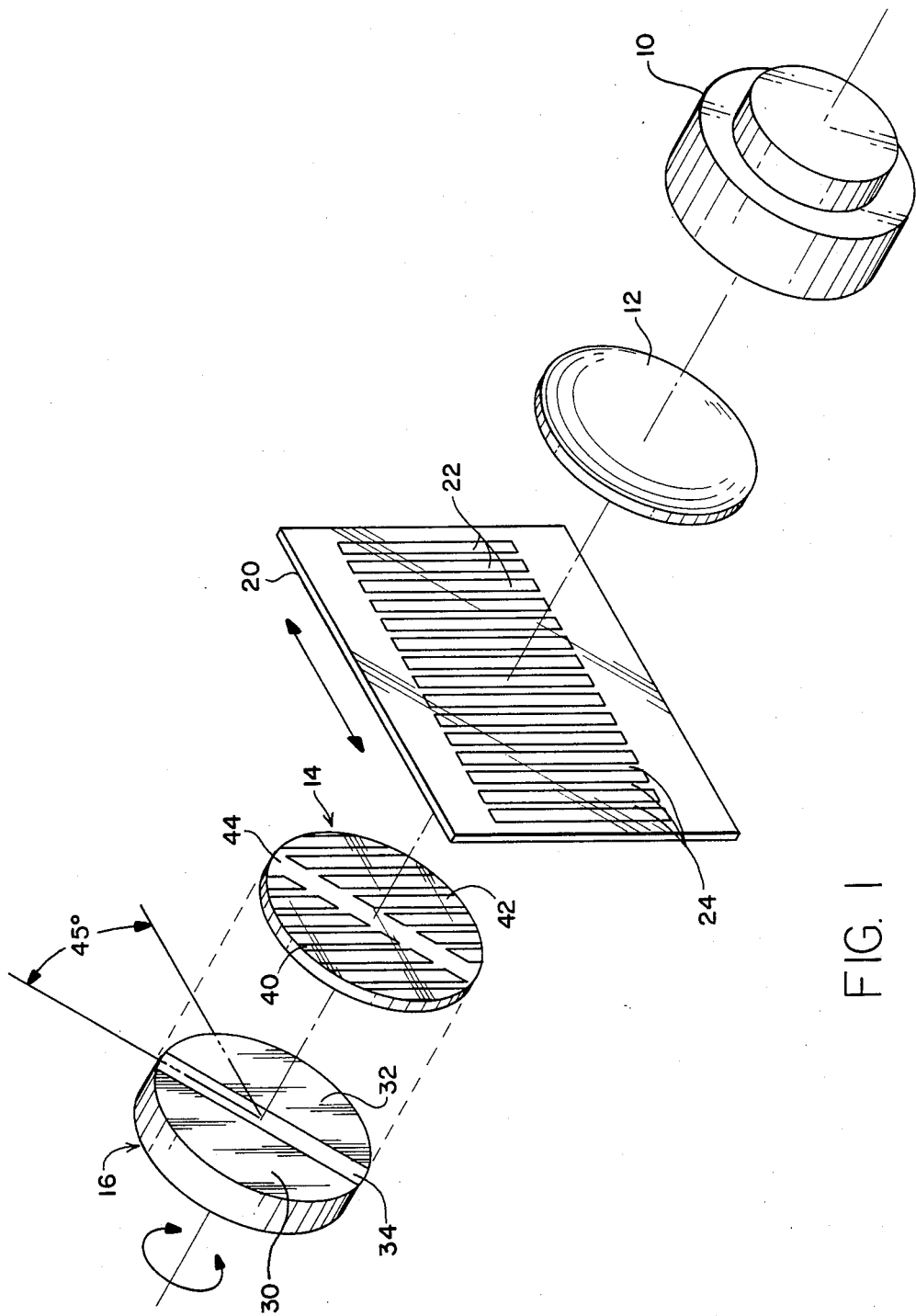
FIG. 1 is a simplified perspective schematic of the optical encoder showing the major elements including light source, collimating lens, mask and phototransducer array.

With reference to FIG. 1, the major elements of an optical encoder are depicted schematically. A light source 10, a collimating lens 12, a mask 14 and a photodetector array 16 are mounted on a single axis in a suitable housing. Provision is made in the housing to enable a movable scale 20 to pass between collimating lens 12 and mask 14 in a direction perpendicular to the alignment axis of the light source 10, lens 12, mask 14 and array 16.

The movable scale 20 contains multiple, rectangular translucent regions 22 which are separated by multiple, rectangular opaque regions 24. The long axis of the rectangular opaque and translucent regions 24, 22 are parallel to each other and perpendicular to the direction of scale movement. Thus, a closely spaced set of alternating opaque and translucent regions is achieved. The pitch or distance measured in the direction of scale movement between corresponding points on adjacent translucent regions is uniform within the set.

Phototransducer array 16 is a monolithic, integrated circuit comprising two electrically independent photodetectors 30, 32 separated by an insulating strip 34. The array is depicted as having a circular outline to coincide with the general shape of the collimated light beam; however, the outline shape is not critical to the operation of the encoder.

The insulating strip 34 separating photodetectors 30, 32 is positioned so that the long axis of the strip forms an acute angle with the direction of scale movement. The angle depicted is 45 degrees although it is understood that any angle other than 0 or 90 degrees will accomplish to varying degrees the purpose of the invention.

Mask 14 contains two sets of alternating opaque and translucent regions 40, 42. The sets 40, 42 are separated by opaque region 44 having generally similar dimensions as the insulating strip 34 on phototransducer array 16. The mask 14 is mounted over phototransducer array 16 so that opaque region 44 of the mask coincides with insulating strip 34 of the array. The alternating opaque and translucent regions in sets 40 and 42 on mask 14 are parallel to the alternating opaque and translucent regions on scale 20. In addition, the pitch of each set 40, 42 is identical to the pitch of scale 20. The width of opaque section 44 on mask 14 is determined so that the alternating opaque and translucent regions in set 40 are displaced from those in set 42 a distance in the direction of scale movement equal to one quarter of the pitch.

Thus it will be understood that movement of the scale will cause light to be alternately transmitted and blocked to each of the photodetectors 30, 32. Assuming a starting point where the translucent regions 22 on scale 20 are aligned with translucent regions of set 42 on mask 14, maximum light intensity will fall on photodetector 32. As the scale 20 moves to the right, opaque regions 24 on the scale 20 will eclipse the translucent regions on set 42 until all light to photodetector 32 is blocked. The resulting electrical signal from photodetector 32 produces a triangular waveform. The identical process occurs to photodetector 30, however the displacement between mask sets 40 and 42 causes the waveform produced by photodetector 30 to lag or lead that produced by photodetector 32 by 90 electrical degrees. Whether the waveform from photodetector 30 lags or leads that of photodetector 32 depends on the direction of scale movement.

Phototransducer array 16 and mask 14 are fixedly mounted in a rotatable housing having its center of rotation coincident with the centers of the array 16 and mask 14. Rotation of the housing provides bilateral adjustment of phase angle in a manner subsequently described.

Figure 2:
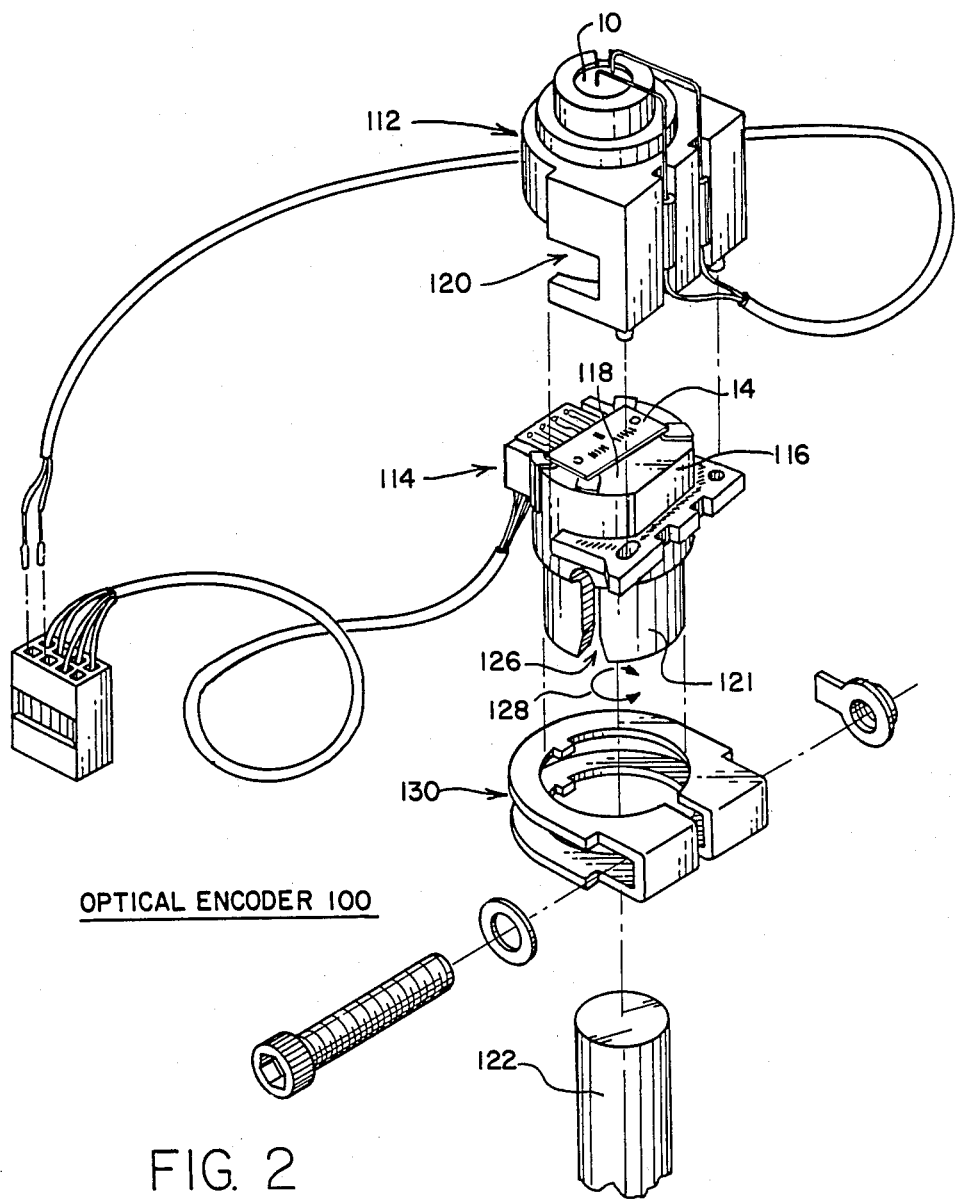
FIG. 2 is an exploded view in perspective of an optical encoder apparatus depicted schematically in FIG. 1.

Turning now to FIG. 2, one embodiment of a suitable housing for the optical encoder stationary elements is described. The encoder apparatus 100 is formed of two parts, a cap 112 and a receptor 114. Cap 112 includes a single light source 110 and a beam collimating lens (not shown). Receptor 114 includes an upper cylindrical body 116 defining a flat top surface 118. Mounted on surface 118 is phototransducer array 16 (not shown) and mask 14.

When cap 112 is mounted on receptor 114, the light source 10, collimating lens 12, mask 14 and array 16 are held in alignment. In addition, a transverse gap 120 is defined between the lower edge of the cylindrical portion of cap 112 and receptor 114. This gap 120 accomodates the movable scale 20 (not shown), and enables its alternating opaque and translucent regions 22, 24 (not shown) to intercept the light beam from light source 10 and lens 12 on its way to photodetector array 16.

The receptor 114 includes a lower cylindrical portion 121 to facilitate mounting of the apparatus 100 to a mounting post 122. This post is secured to a base structure (not shown) which also supports the structure mounting the movable scale 20. The cylindrical portion 121 includes a compression-enabling peripheral slot 126 extending through the cylindrical portion 121 in a direction generally parallel with the axis of rotation 128. A keyed U-shaped metal compression clamp 130 is provided to fit over the cylindrical portion 121. The clamp 130 compresses the portion 121 and enables it to be locked in proper alignment, both vertical and rotational, on the mounting post 122. Surface 118 on receptor 114 is formed to be perpendicular to the axis of rotation 128. Phototransducer array 16 and mask 14 are mounted on surface 118 so that their centers coincide with axis of rotation 128.

Figure 3:
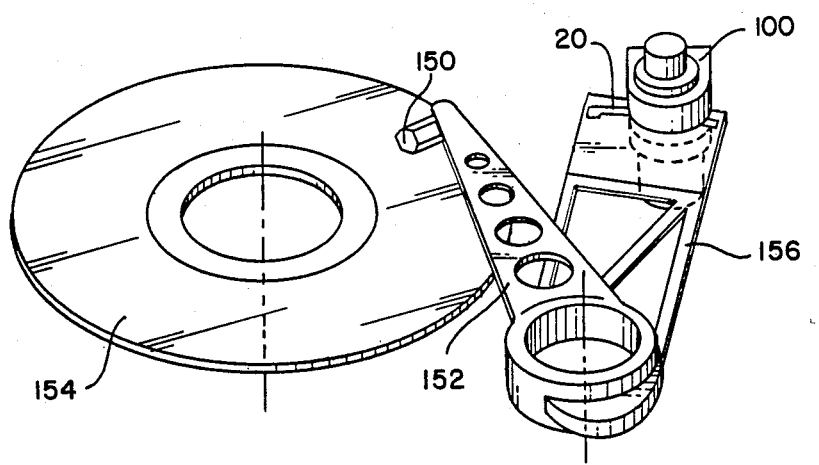
FIG. 3 is a diagrammatic depiction of a rotating disk data storage device using an optical position encoder incorporating the principles of the present invention.

FIG. 3 depicts optical encoder apparatus 100 mounted on one type of host equipment. The host equipment shown is a magnetic storage disk assembly commonly used as a memory device for computers. Magnetic pickup head 150 is mounted on a rotatable arm 152 which moves the head 150 across a rotating magnetic storage disk 154. Connected to arm 152 is a rigidly attached frame 156 which holds scale 20. Movement of head 150 causes the scale 20 to move within the transverse slot 120 of encoder 100. In this manner position the velocity information developed by the encoder 100 can be used in a positioning control system for the pickup head 150.

PHASE ANGLE ADJUSTMENT

Figure 4:
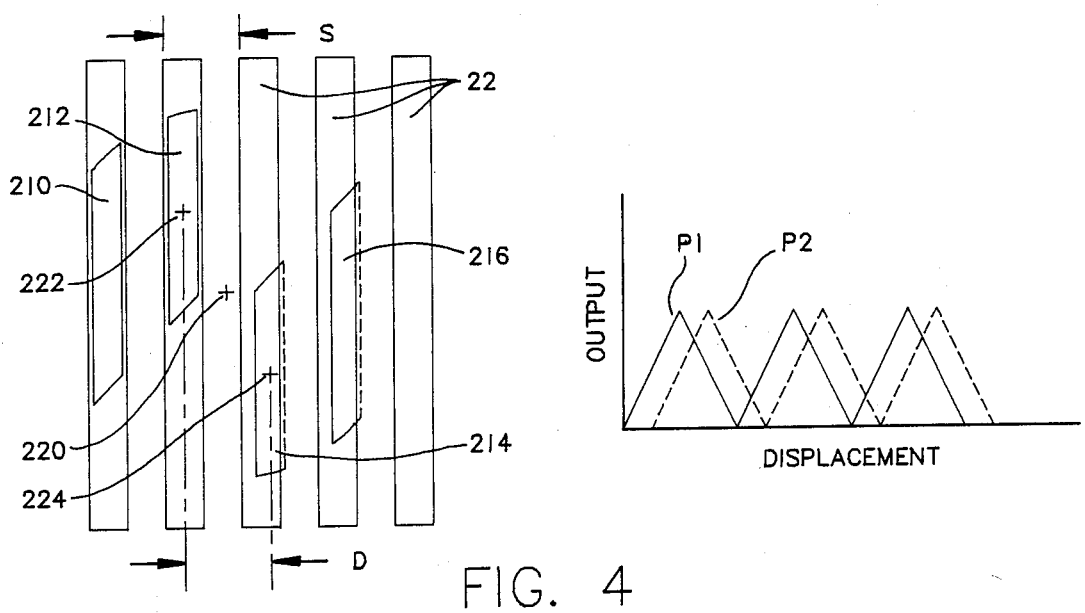
FIG. 4 is a partial schematic plan view of the movable scale overlying the photodetector and mask.
Figure 5:
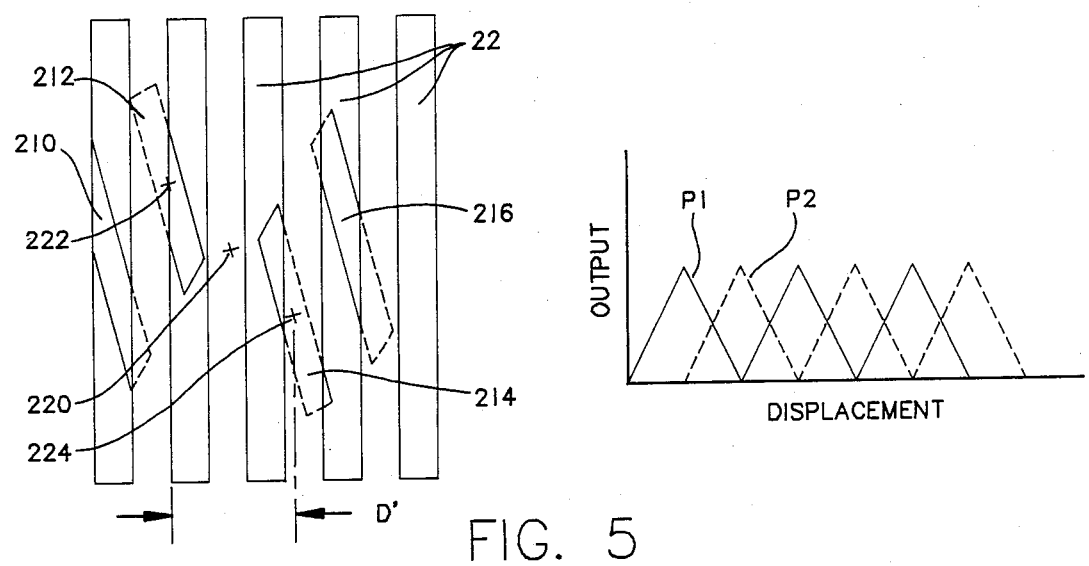
FIG. 5 is a partial schematic plan view similar to FIG. 4 in which the photodetector array and mask have been rotated counter clockwise 15 degrees.
Figure 6:
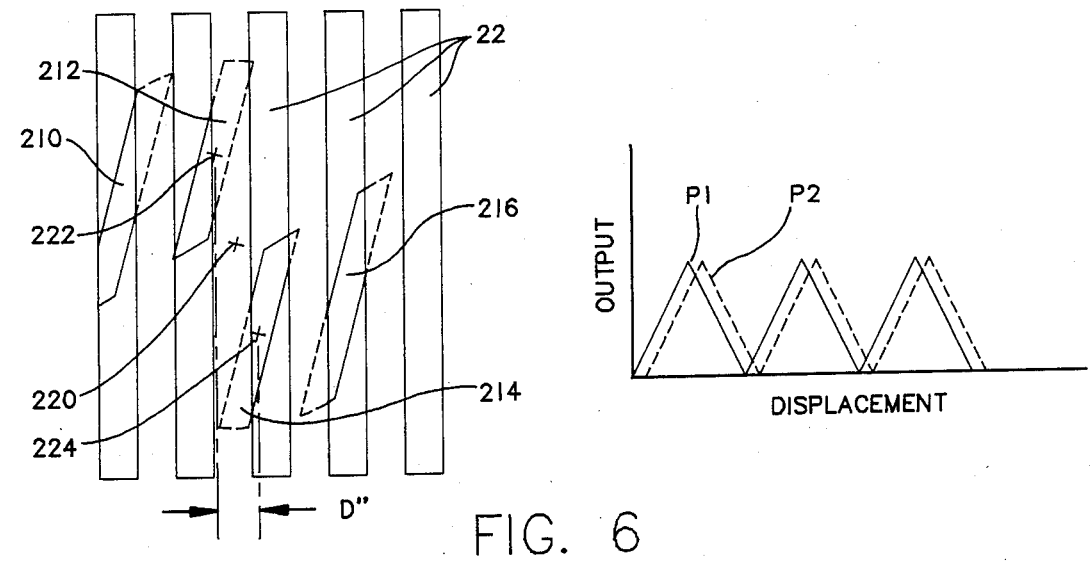
FIG. 6 is a partial schematic plan view similar to FIG. 4 in which the photodetector array and mask have been rotated clockwise 15 degrees.

Turning now to FIGS. 4–6 the effect on phase angle of rotating phototransducer array 16 and mask 14 will be seen in FIG. 4. A simplified plan schematic of scale 20 overlying mask 14 is presented. Slots 22 represent translucent regions on scale 20. The distance between corresponding points on adjacent slots 22 or pitch is uniform and represented as "S". In operation, the scale 20 and slots 22 move horizontally in either direction. For purposes of the following description it will be assumed that scale 20 is moving to the left. In addition to the slots 22 on scale 20, the translucent regions of mask 14 under scale 20 are represented by slots 210, 212, 214 and 216. Slots 210 and 212 are representative of set 40 on mask 14 and overlie photodetector 30. Similarly slots 214 and 216 represent set 42 on mask 14 overlying photodetector 32. The pitch of slots 210, 212 matches that of slots 214 and 216 as well as that of slots 22 on mask 20. Centerline point 220 marks the center of rotation of photodetector array 16 and mask 14. Centerline marks 222 and 224 reflect the centroids of slots 212 and 214 respectively.

As can be seen in FIG. 4 when mask slots 210, 212 are in alignment with slots 22 on scale 20, mask slots 214 and 216 are displaced to the right approximately $\frac{1}{4}$ S. The result of this displacement is that the electrical signal P1 generated by photodetector 32 leads the signal P2 generated by photodetector 30 by approximately 90 electrical degrees. The graph to the right of FIG. 4 shows the electrical signals P1, P2 produced as the scale moves to the left alternately blocking and passing light to photodetectors 32, 30.

The amount that signal P1 leads P2 depends on the distance between slots 212 and 214 and the pitch of slots 22. Here the distance between slots 212 and 214 is shown as D and is measured between centroid 222 of slot 212 and centroid 224 of slot 214. Phase angle in degrees is thus given by the following formula:

$$\text{Phase angle} = D\text{-}S/S \times 360$$

FIG. 5 shows the effect on phase angle of rotating the photodetector array 16 and mask 14 counter clockwise approximately 15 degrees. The effective distance in the direction of scale movement between centroid 222 of slot 212 and centroid 224 of slot 214 increases from D to D'. In accordance with the above formula, phase angle between P1 and P2 is correspondingly increased as depicted in the graph of FIG. 5.

FIG. 6 shows the effect of rotating the photodetector array and mask clockwise approximately 15 degrees from the neutral position reflected in FIG. 4. Here, the distance between centroids 222 and 224 is decreased to D'' causing a corresponding decrease in phase angle as shown in the graph to the right of FIG. 9.

As can be seen from FIGS. 5 and 6, rotation of the mask 14 alters the parallel relationship between slots 210, 212, 214, 216 on mask 14 and slots 22 on scale 20. The effect of this non parallel relationship is to distort slightly the triangular waveforms of the electrical signals P1, P2 produced by photodetectors 32, 30. In addition, the parallel relationship existing in FIG. 4 provides an instant when the full area of slots 210 and 212 transmits light to photodetector 30. A similar instant occurs for photodetector 32. However, when the mask 14 has been rotated to a non parallel relationship, there is no single instant when the full areas of slots 210, 212 transmit light. Consequently, the non parallel relationship reduces maximum electrical power output from the photodetectors.

It is understood that in a particular encoder design, the distortion of waveform and loss of electrical power can be minimized while the phase angle calibration characteristics are optimized by varying design parameters such as the angle of insulating strip 34 in respect to the locus of scale movement, the lengths of slots 210, 212, 214, 216 and the distance of centroids 222 and 224 from center of mask rotation 220.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosures and description herein are purely illustrative and are not intended to be in any sense limiting.

We claim:

1. A method for adjusting the sensitivity of lead-lag phase angle trim in an improved optical encoder having a scale, which moves through a locus, with alternating opaque and translucent regions extending generally perpendicular to the locus of scale movement; and, mounted on a single axis of rotation in a stationary housing, a light source, two or more photodetectors facing said light source and a mask having two or more sets of alternating opaque and translucent regions parallel to said opaque and translucent regions on said scale and arranged so that each set overlies one of said photodetectors shielding said photodetector from said light source whereby movement of said scale alternately blocks and transmits light to said photodetectors causing said photodetectors to output phased, triangular waveform electrical signals indicative of scale velocity and position, the method of adjusting phase angle trim comprising the steps of:

locating the centroids of said mask sets of alternating opaque and translucent regions on opposite ends of an imaginary line passing through said axis of rotation and forming an acute angle with the locus of scale movement, overlaying said mask sets on the photodetectors such that a phase angle between the signals is indicated, and providing means for adjustably rotating said housing about said axis of rotation wherein the range of phase angle lead-lag trim of said electrical signals per unit of rotation about said axis is adjusted by the step of selecting the acute angle of the imaginary line relative to the locus of movement.

2. The method for adjusting phase angle lead-lag trim in an improved optical encoder as recited in claim 1 wherein said acute angle selected to be 45 degrees.

3. The method for adjusting phase angle lead-lag trim in an optical encoder as recited in claim 1 further comprising the step of positioning the periphery of said mask sets of alternating opaque and translucent regions to form a circular area generally coinciding with the circular area of the light beam produced by said light source.

4. An optical relative position encoder comprising:
  a rotatable housing,
  a light source secured to the housing for generating light energy,
  a pair of photodetector means secured to the housing and disposed adjacent one another in substantially coplanar arrangement away from the light source, for generating phase electrical signals in response to light energy generated by the light source,
  a scale moveably positioned between the light source and the pair of photodetector means having alternating opaque and translucent regions extending substantially perpendicular to a locus of relative movement between the scale and the housing;
  a mask having alternating opaque and translucent regions parallel to said opaque and translucent regions on said first member and arranged so that relative movement between the scale and the housing alternately blocks and transmits light to said pair of photodetector means causing said pair of photodetector means to put out electrical signals having a phase difference indicative of relative position and direction of movement of said first and second members, a substantially lineal light blocking zone formed on the mask, having its centroid at an axis of rotation of the housing and arranged at a predetermined acute rotational angle relative to the locus of movement of the scale, whereby rotating the housing enables adjustment of the lead and lag of the phased electrical signals relative to a nominal phase difference therebetween, and wherein the acute rotational angle of the light blocking zone determines the amount of phase lead and lag adjustment per unit of rotation of the housing about the centroid of the light blocking zone.

5. The optical encoder set forth in claim 4 wherein said predetermined rotational acute angle of the light blocking zone is approximately 45 degrees.

6. The optical encoder set forth in claim 4 wherein said pair of photodetector means are formed as two electrically independent photodetectors of a monolithic integrated integrated circuit and wherein the photodetectors are separated by an insulating strip which is substantially congruent with the light blocking zone of the mask.

* * * * *